United States Patent [19]

Focke et al.

[11] 4,085,568
[45] Apr. 25, 1978

[54] FOLDABLE BLANKS FOR MAKING PACKETS FOR ROD-SHAPED ARTICLES

[75] Inventors: Heinz Focke; Kurt Liedtke, both of Verden, Aller, Germany

[73] Assignee: Focke & Pfuhl, Verden, Aller, Germany

[21] Appl. No.: 570,152

[22] Filed: Apr. 21, 1975

[30] Foreign Application Priority Data

Apr. 23, 1974 Germany .............................. 2419437
Aug. 16, 1974 Germany .............................. 2439192

[51] Int. Cl.$^2$ ............................................. B65B 11/32
[52] U.S. Cl. ....................................... 53/234; 53/371; 53/383
[58] Field of Search ................. 53/148, 234, 371, 383; 93/12 C

[56] References Cited

U.S. PATENT DOCUMENTS

| | | | |
|---|---|---|---|
| 467,040 | 1/1892 | Mellen | 53/234 X |
| 737,379 | 4/1905 | Hopkins | 53/234 |
| 1,313,863 | 8/1919 | Smith et al. | 53/234 |
| 1,485,598 | 3/1924 | Croxford | 53/234 |
| 1,946,697 | 2/1934 | Johnson et al. | 53/234 |
| 2,179,685 | 11/1939 | Chalmers | 53/371 X |
| 2,196,666 | 4/1940 | Moore | 53/234 X |
| 2,603,047 | 7/1952 | Malhiot | 53/234 X |
| 2,608,039 | 8/1952 | Abramowski | 53/234 |
| 2,933,871 | 4/1960 | Brook | 53/234 |
| 2,966,832 | 1/1961 | Vergobbi | 53/234 X |
| 3,055,490 | 9/1962 | Anderson | 53/234 |
| 3,805,477 | 4/1974 | Kruse et al. | 53/234 X |
| 3,813,849 | 6/1974 | Stambera | 53/234 |
| 3,857,221 | 12/1974 | Schmermond | 53/234 |
| 3,890,766 | 6/1975 | Hatta | 53/234 |
| 3,948,115 | 4/1976 | Seragnoli | 53/234 |

Primary Examiner—Othell M. Simpson
Assistant Examiner—John Sipos
Attorney, Agent, or Firm—Sughrue, Rothwell, Mion, Zinn and Macpeak

[57] ABSTRACT

A packet made from a foldable blank is provided in which at least two end flaps of the blank are interconnected by pressing together in an intermediate position projecting from the plane of the end wall and front wall of the packet and being folded over into the plane of the end wall and front wall. There is also provided an improved method of mechanically making and closing packets, in which the end flaps projecting from the front surfaces are pressed together and connected to one another by pressing jaws and then folded over towards the front surfaces and fixed in the plane of the front surface. The apparatus described is for use in such a method.

12 Claims, 22 Drawing Figures

Fig. 6
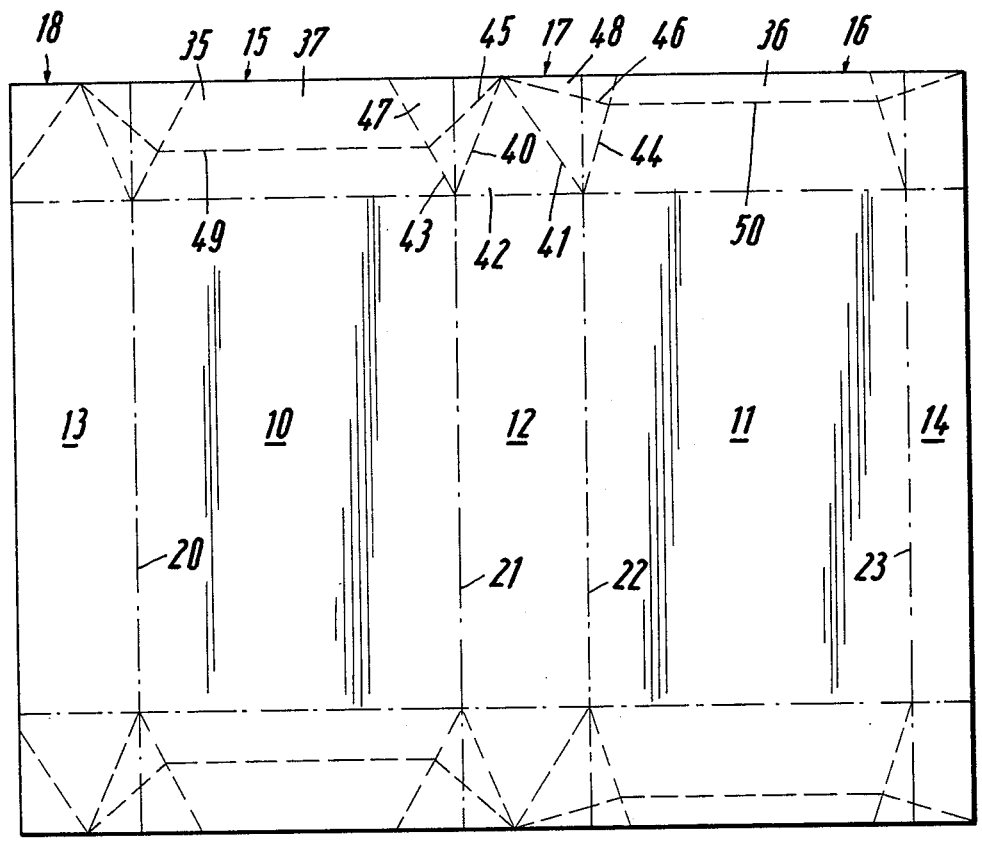
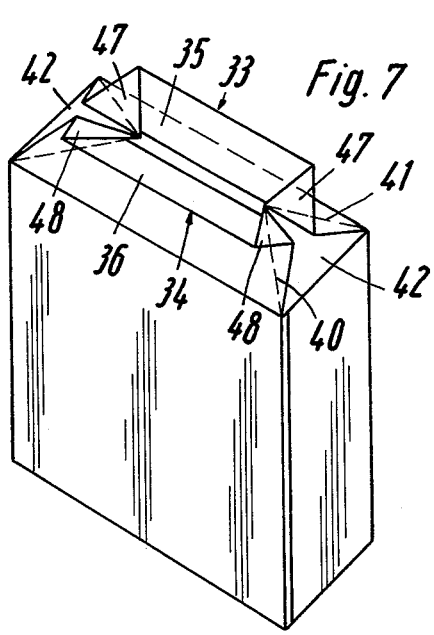
Fig. 7
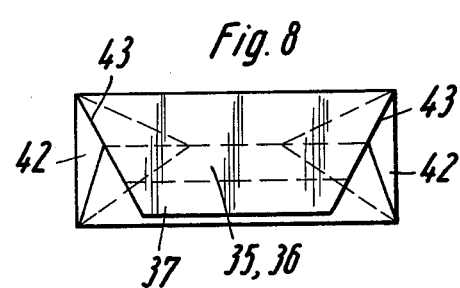
Fig. 8

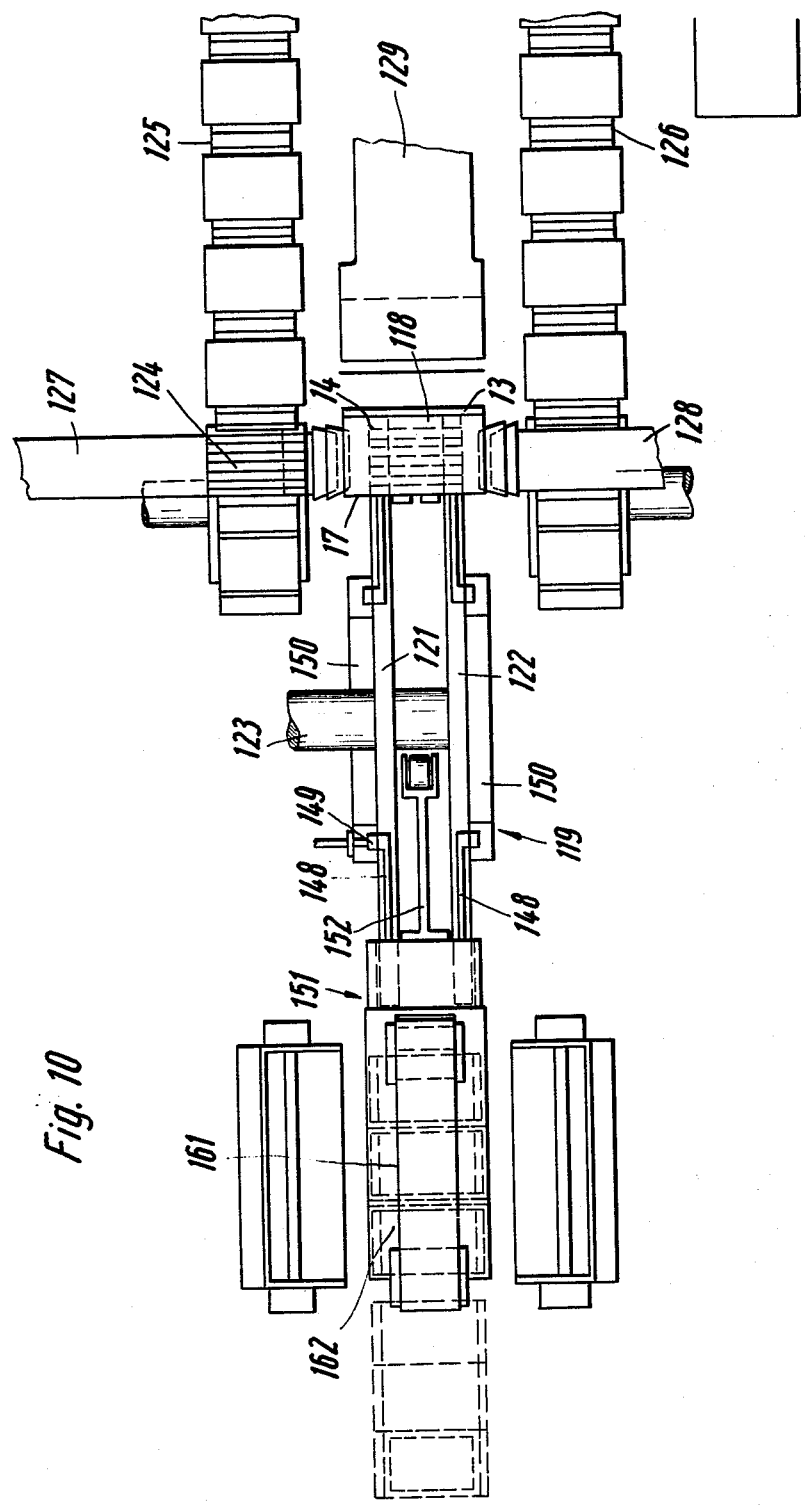

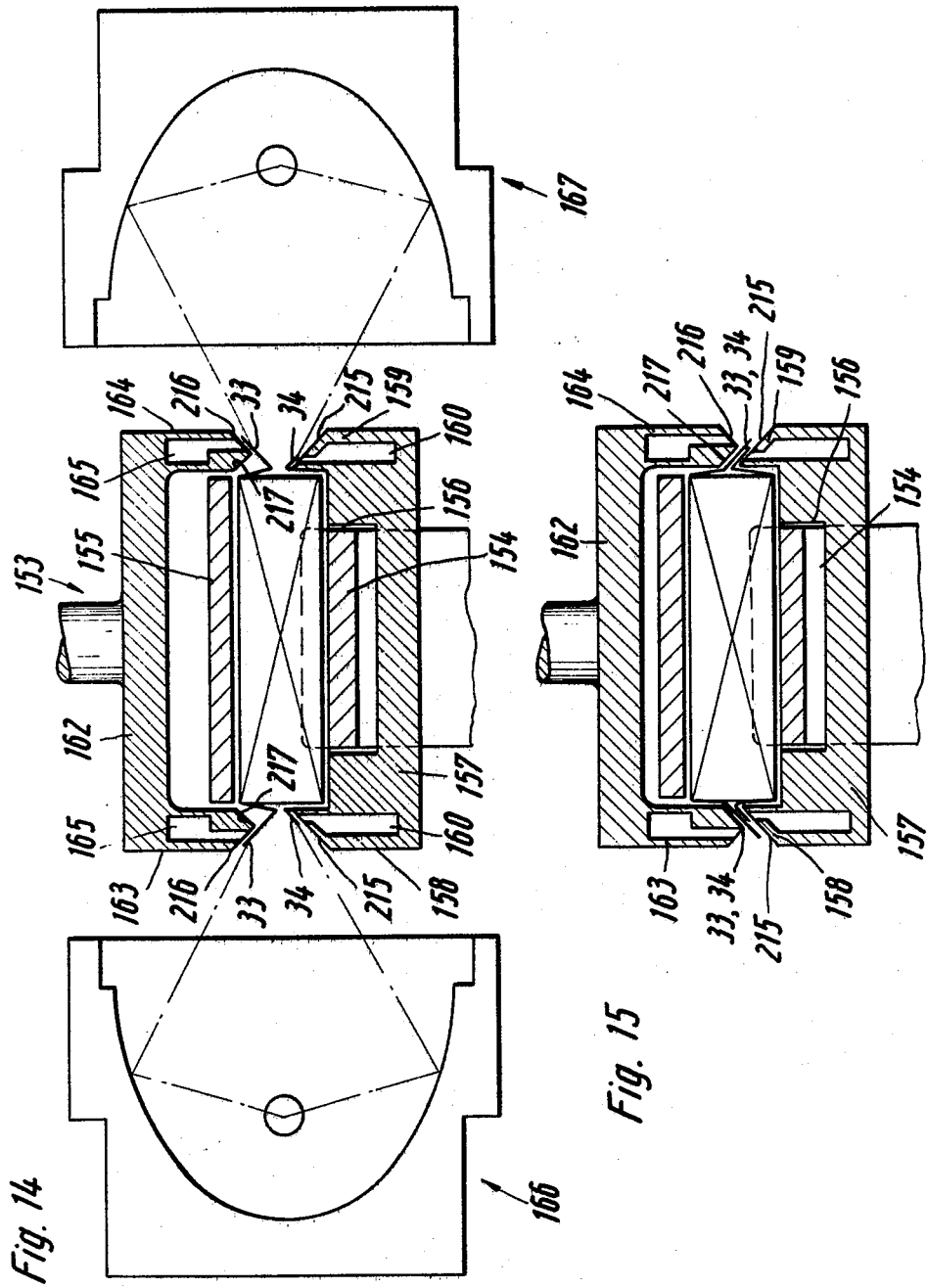

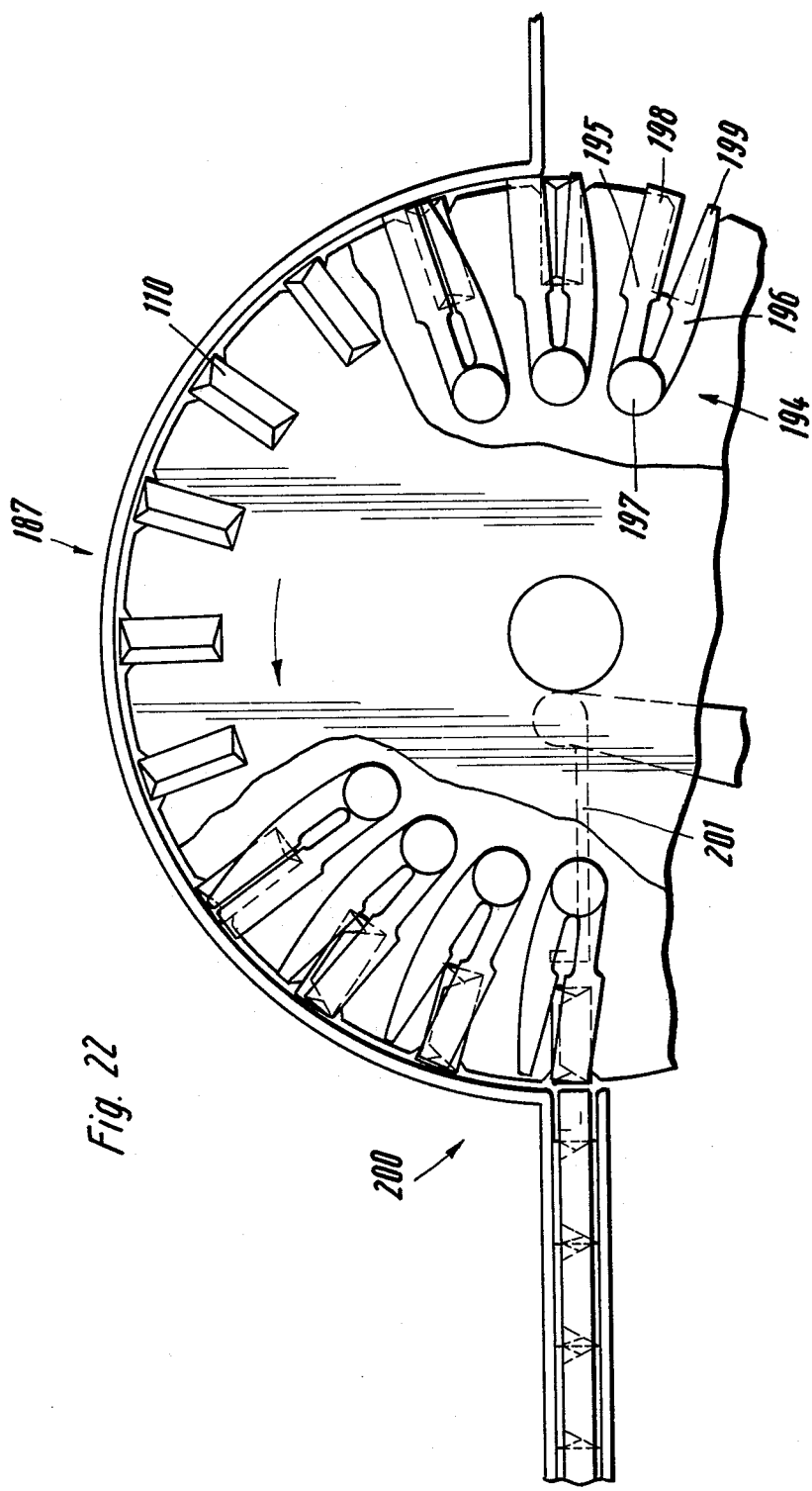

FOLDABLE BLANKS FOR MAKING PACKETS FOR ROD-SHAPED ARTICLES

FIELD OF THE INVENTION

This invention relates to a packet made from a foldable blank, more particularly a laminated foil, for receiving rod-shaped articles, preferably cigarettes, the blank enclosing the contents of the packet after the form of a hose, and end flaps (opposite longitudinal end flaps and lateral end flaps) projecting at the end faces forming an end wall and front wall by folding over towards the contents of the packet and gluing or welding. The invention also relates to a method and apparatus for the manufacture and closure of packets of the kind specified.

The invention relates to a novel type of rectangular packet for cigarettes or the like, preferably made from a single blank. Particularly suitable for this purpose is a laminated sheet, in which a polyethylene sheet has an aluminum foil glued on one side and a layer of paper glued on the other. These layers are adjoined by outer layers of polyethylene sheeting. Laminated foils of this kind can be used to produce sealing-tight packet closures by thermal welding.

OBJECT OF THE INVENTION

It is an object of the invention to provide a rectangular cigarette packet whose preferably single blank can be closed without appreciable stressing on the contents of the packet by thermal welding, gluing or the like, with the application of pressure.

SUMMARY OF THE INVENTION

According to the first aspect of the present invention, there is provided a packet made from a foldable blank, more particularly a laminated foil, for receiving rod-shaped articles, preferably cigarettes, the blank enclosing the contents of the packet after the form of a hose, and end flaps (opposite longitudinal end flaps and lateral end flaps) projecting at the end faces forming an end wall and front wall by folding over towards the contents of the packet and gluing or welding, wherein at least two end flaps of the blank are interconnected by pressing together in an intermediate position projecting from the plane of the end wall and front wall of the packet and are folded over into the plane of the end wall and front wall.

Normally, in the zone of the end and front walls, the end flaps are folded into an intermediate position to form closure strips lying opposite one another. The closure strips, extending substantially over the length of the end surface, are pressed together and welded or glued to one another to produce the sealing tight closure between clamping jaws and the apparatus. The resulting sealing tight closure flap is folded over into the plane of the packet end and front walls and fixed in that position.

According to the second aspect of the present invention, there is provided a method of mechanically manufacturing and closing rectangular packets, more particularly for cigarettes, from at least one blank which encloses the contents of the packets after the fashion of a hose and has end flaps which project at front surfaces and can be folded thereagainst. In this method the end flaps projecting from the front surfaces are pressed together and connected to one another by two pressing jaws receiving the end flaps therebetween, and then the interconnected end flaps are folded over towards the front surfaces and fixed at a part of the blank in the plane of the front surface.

In the method according to the invention, an intermediate position is formed in which the closure strips project from the plane of the packet end and front walls. A suitable V-shaped tool is used to bend the closure strips outwards so that they are directed substantially to be interconnected can then be plasticised or provided with an adhesive. Then the closure strips are pressed against one another by a suitable tool, such as clamping or welding jaws.

According to the third aspect of the present invention, there is provided an apparatus for the manufacture and closure of packets, more particularly for cigarettes, from at least one blank which encloses the contents of the packet after the fashion of a hose and has end flaps which project at the front surfaces and can be folded thereagainst. The apparatus comprises at least one turret which is driveable in cadence and which, in use, receives the packets and the blanks therefor in U-shape in radially directed pockets open to the outside, synchronously actuated folding and closing tools being disposed on both sides of the turret for folding and closing the laterally projecting end flaps of the blank.

The apparatus according to the invention has at least one turret driven in cadence which receives the packets or blanks therefor in U-shape in outwardly open, radially directed pockets. Disposed on both sides of the turret are folding and closure tools for folding and closing the laterally projecting end flaps of the packets. These are disposed transversely in the turret pockets in such a way that the blank parts projecting at the end surfaces also project laterally beyond the turret.

BRIEF DESCRIPTION OF THE DRAWINGS

For a better understanding of the present invention and to show how the same may be put into effect, reference will now be made, by way of example, to the accompanying drawings, in which:

FIG. 6 shows, in the unfolded state, a blank for an alternate embodiment of packet according to the invention, FIG. 7 shows a perspective view, corresponding to FIG. 2, of the blank of FIG. 6, FIG. 8 shows a plan view of the end or front wall of the completed packet made from the blank shown in FIGS. 6 and 7, FIG. 10 shows a plan of the apparatus of FIG. 9, FIG. 14 shows a sectional view, on an enlarged scale, taken along the line XIV—XIV of FIG. 9, FIG. 15 shows a cross-sectional view corresponding to FIG. 14, but without infra-red radiators, with the individual parts in a different relative position, FIG. 22 shows a side view of a modification of the turret of the apparatus of FIG. 18 to 21.

DETAILED DESCRIPTION OF THE PREFERRED EMBODIMENTS

Figure 1:
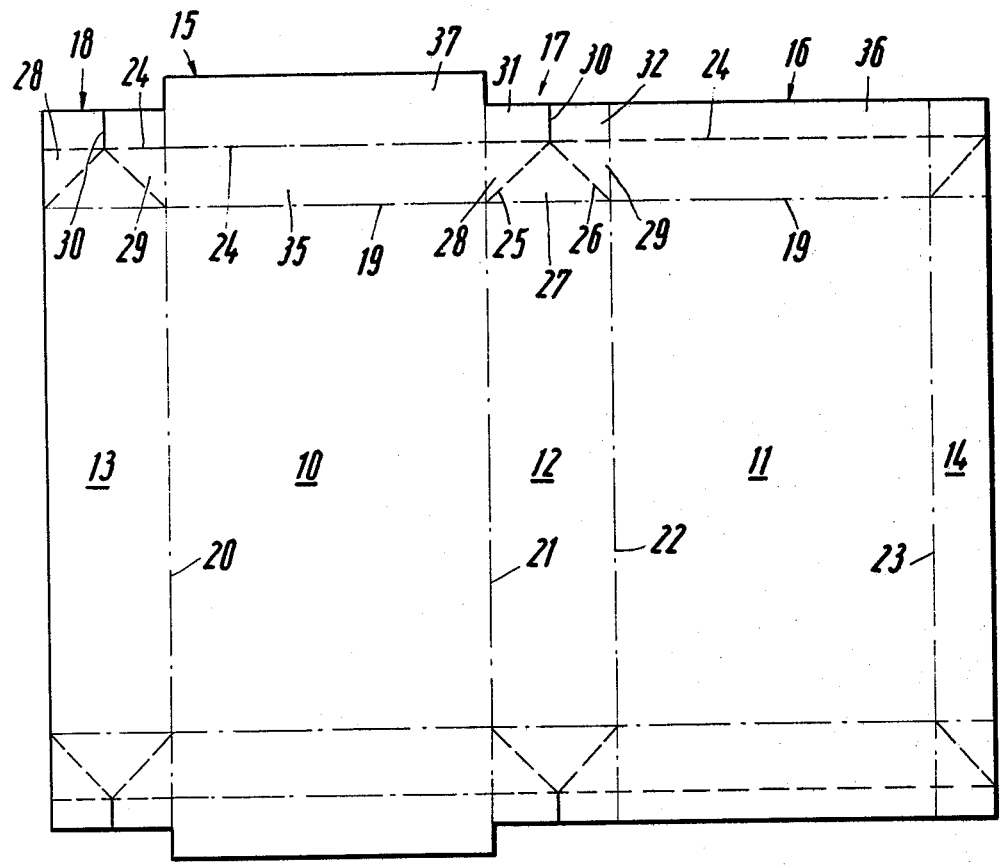
FIG. 1 shows, in the unfolded state, a blank for making a packet according to the invention.
Figure 2:
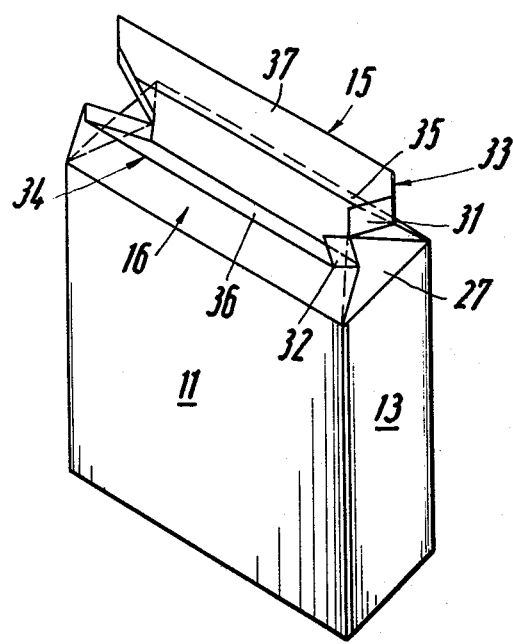
FIG. 2 shows a perspective view of the blank of FIG. 1 folded into an intermediate position.
Figure 3:
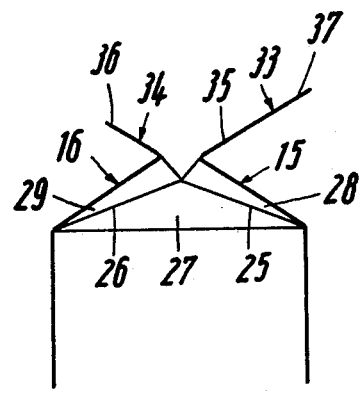
FIG. 3 shows a side view, to an enlarged scale, of the top part of the blank shown in FIG. 2.
Figure 4:
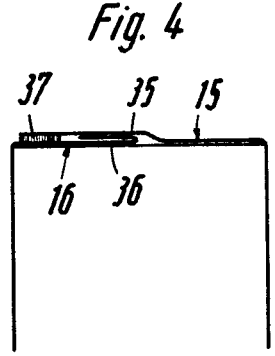
FIG. 4 shows a side view of the top part of the blank of FIGS. 1 to 3 with the front wall completed to form a packet.
Figure 5:
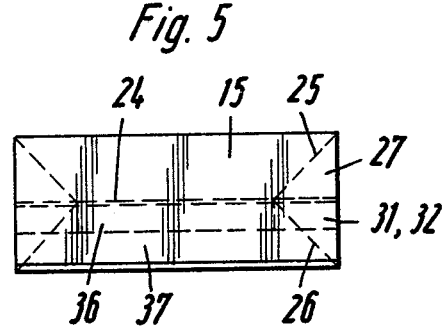
FIG. 5 shows a plan view of the end or front wall of the completed packet shown in FIG. 4.
Figure 9:
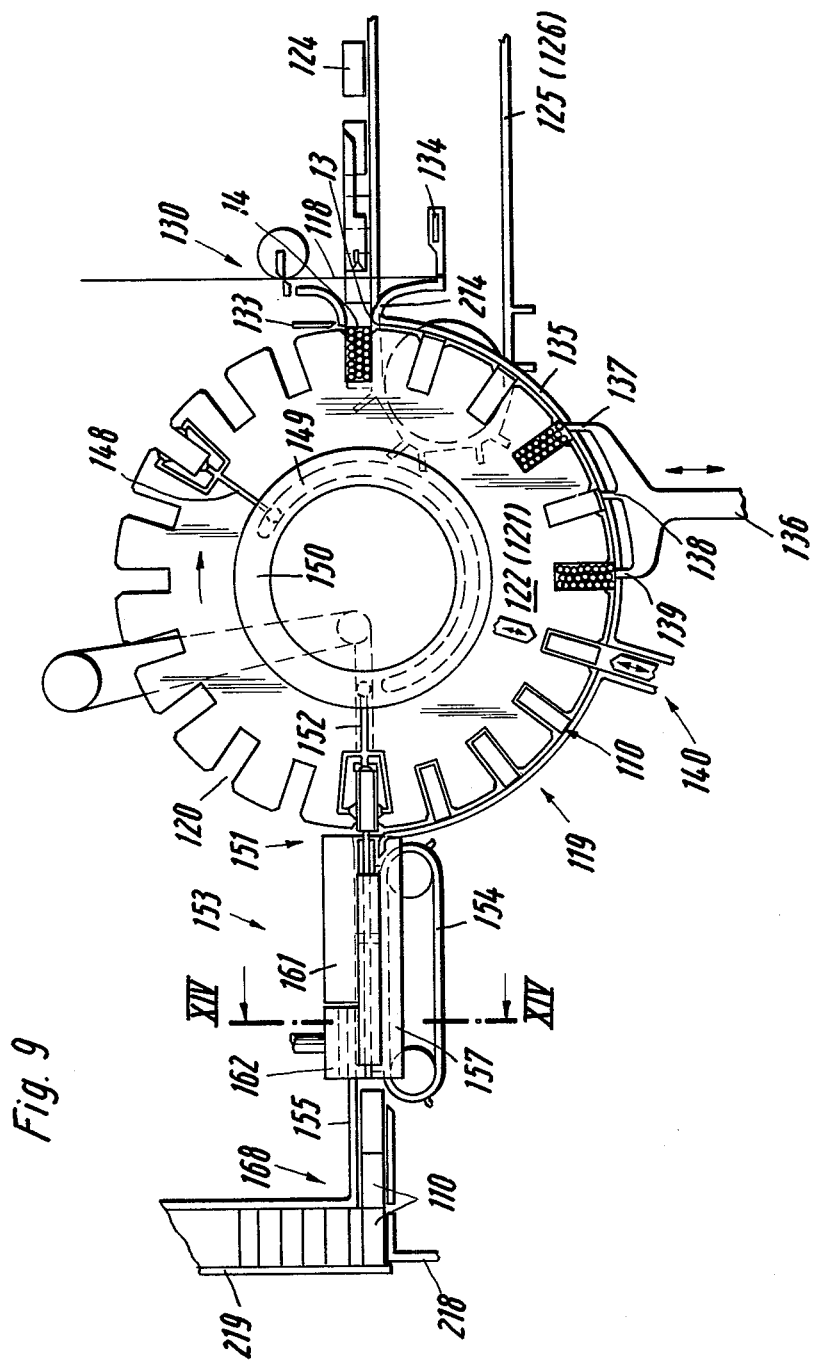
FIG. 9 shows a diagrammatic side view of an apparatus for the manufacture and closure of a packet according to the present invention.

Referring now to the drawings, in the embodiment illustrated in FIGS. 1 to 5, the blank is sub-divided into a number or areas to form a front wall 10, a rear wall 11 and side walls 12 and 13. The side wall 13 is connected to a side strip 14. Projecting end flaps, namely two longitudinal end flaps 15 and 16 and lateral end flaps 17 and 18, are provided at the front and end sides. The end flaps are offset in relation to the front, rear and side walls by a transversely extending folding line 19 which can be pre-embossed. The front, rear and side walls 10 to 13 are bounded against one another by parallel longitudinal folding lines 20 to 23. These longitudinal folding lines can also be pre-embossed.

Of the longitudinal end flaps, the flap 15, which is on the outside when the packet is completed, is of dimensions and shape such that it extends substantially over the whole end surface when the packet is closed. The other end flaps 16 to 18 extend only over part of the end surface and are, therefore, set back in relation to the free edge of the outer longitudinal end flap 15.

First of all, the customary hose-shaped intermediate form is produced by folding in the zone of the longitudinal folding lines 20 to 23 and by connecting the side wall 13 to the side strip 14.

The end flaps 15 to 18 are interconnected all around.

The lateral end flaps 17 and 18 have two inclined folding lines 25 and 26 which start from the inner corners — that is, the corners adjacent the front, rear and side walls — and converge on a transverse folding line 24. The folded lines 25 and 26 bound a triangular gusset 27 bearing against the contents of the packet, and triangular flaps 28 and 29 of the lateral end flaps 17 and 18 which can be folded over and adjoin the adjacent longitudinal end flaps 15 and 16. Starting from the tip of the gusset 27, a parting cut 30 extends through the remainder of the lateral end flaps 17 and 18. The cut 30 forms two closure flaps 31 and 32 of the lateral end flaps 17 and 18 which bear against one another and are to be interconnected.

In the making of the end and front side closure, first the projecting lateral end flaps 17 and 18 are folded inwards using suitable folding tools, so that the triangular gusset 27 bears inside against the contents of the packet. At the same time, the longitudinal end flaps 15 and 16 are folded over. However, in an intermediate folding, the free edge zones of the end flaps 15 and 18 divided-off by the transverse folding line 24 are folded upwards substantially into a position at an angle to the end surface of the packet such that, as shown more particularly in FIG. 3, closure strips 33 and 34 directed in wedge-shape in relation to one another are formed. They are formed by free edge strips 35 and 36 of the longitudinal end flaps 15 and 16 and the inwardly folded closure flaps 31 and 32 of the lateral end flaps 17 and 18.

The projecting closure strips 33 and 34 are then activated on their inner sides — that is, on their facing sides — or provided with a glue or the like, or plasticised by radiators (in the case of laminated foils). They are then pressed together by a tool and interconnected.

The edge strip 36 of the inner longitudinal end flap is then folded over further, while the outer longitudinal end flap 15 is folded back into the original flat position, and then the whole end surface of the packet, including the subjacent folded layers, is covered. The outer longitudinal end flap 15 is fixed by an edge zone 37 at the top side of the inner longitudinal end flaps 16, to complete the closure.

The blank and packet illustrated in FIGS. 6 to 8 is basically similarly constructed. However, the end flaps 15 to 18 are of continuously identical width. To enable the end closure to be performed with an outer longitudinal end flap 15 which covers at least the majority of the end surface of the packet, the edge strips 35 and 36 of the end flaps are so disposed that the intermediate position shown in FIG. 7, and corresponding to FIGS. 2 and 3 of the first embodiment, the closure strips 33 and 34 in wedge-shape or standing upright extend outside the imaginery longitudinal central plane of the packet.

In detail, the packet is constructed as follows:

The lateral end flaps 17 and 18 have preferably pre-embossed folding lines 40 and 41, which extend at an angle to one another as far as the edge and are so directed as to produce a gusset 42 in the shape of an oblique angled triangle. Triangular closure gussets 47 and 48 of different sizes are defined in a portion of the lateral end flaps 17 and 18 and the adjacent longitudinal end flaps 15 and 16 in conjunction with further oblique folding lines 43 and 44 extending in the zone of the longitudinal end flaps 15 and 16, and with supplementary folding lines 45 and 46. The tips of the closure gussets 47 and 48 run against one another and, therefore, ensure a substantially complete sealing-tight closure of the packet in the zone of the lateral end flaps 17 and 18.

The supplementary folding lines 45 and 46 adjoin transverse folding lines 49 and 50 in the longitudinal end flaps 15 and 16 to bound the lateral closure strips 35 and 36.

To form a packet from the blank, first of all, the lateral end flaps 17 and 18 are folded inwards. The irregular triangular gussets 42 bear against the contents of the packet. At the same time, the longitudinal end flaps are folded over into an intermediate position (see FIG. 7). By extra folding along the transverse folding lines 49 and 50, the closure strips 35 and 36 are so folded outwards that they are directed in wedge-shape in relation to one another in the intermediate position (see FIG. 3). The lateral end flaps 17 and 18 are involved in the closure by the closure gussets 47 and 48.

The packing units described in detail hereinafter are suitable for performance of the aforedescribed folding and closing operations and for filling the packet.

In the embodiment of apparatus illustrated in FIGS. 9 to 15, packets 110, each consisting of a single blank 118, are mainly folded and closed in and on a turret 119. A packet 110 is received in each of outwardly open, radially directed pockets 120. The packets 110 are so disposed in the pockets 120 that front surfaces 111 of the packets are laterally flush with the turret 119 or extend for a short distance therefrom.

The turret 119 consists of two spaced-out turret discs 121 and 122 disposed on a common shaft 123 rotated in steps. The pockets 120 of the turret, therefore, each consist of two radial incisions in the turret discs 121 and 122.

Prepared groups of cigarettes 124 each forming the contents of a packet 110 are fed to the turret 119. The groups of cigarettes 124 are taken from, for instance, conventional cigarette magazines (not shown) and fed successively via a conveyor, in this case a pocket-chain conveyor 125 and 126, to the turret 119. The two pocket-chain conveyors 125 and 126 terminate on both sides of the turret 119. Groups of cigarettes 124 are alternately taken laterally out of one and of the other of the pocket-chain conveyors 125 and 126 by pushers 127 and 128 and inserted, axes parallel, into a pocket 120 of the turret 119.

Before the insertion of the groups of cigarettes 124, a blank 118 is pushed in U-shape into each pocket 120 in a filling station 130. For this purpose in the embodiment illustrated in FIGS. 9 to 15, use is made of an insertion member 129 which acts in the radial direction of the turret 119, which is moved through the plane of the blank 118 held in readiness and which enters the pocket 120 held in readiness together with the blank 118 folded over in U-shape. Disposed in front of each pocket 120 in the filling station 130 on the outside is a fixed mouthpiece 214 having rounded sliding and bearing surfaces, extending in arcuate shape, for the blank 118.

The blank 118 is so introduced into the pocket 120 that the side wall 13 and side strip 14 and also the end flaps 15 to 18 extend in the radial and axial directions over the pockets 120 and, therefore, over the group of cigarettes 124.

After the blank 118 and group of cigarettes 124 have been inserted, the folding operations required for making the packet start. Even at the filling station 130, the rearward side strip 14, viewed in the direction of rotation of the turret 119, is folded over by an inward-folding member 133 which can move downwards and tangentially in relation to the turret 119. The side wall 13 is also given a strip of glue by a glue applicator 134 at the filling station 130.

As the turret 119 continues to rotate, the filled pocket 120 enters the zone of a fixed outer guide 135 which encloses the turret 119 along part of its periphery. When it runs into this outside guide 135, the side wall 13 is folded over against the side strip 14 already folded over.

During the following operational strokes, the blank 118 enclosing the group of cigarettes 124 in the form of a hose is fixed by the outer guide 135, so that the connection of the side wall 13 to the side strip 14 can set.

If thermally reacting adhesives (hot-melt), thermally weldable foils, or plastics coatings are used, there is provided to make the aforementioned connection a multiple punch 136 whose three pressure fingers 137 to 139 are heated. The ends of the pressure fingers 137 to 139 extend through recesses in the outer guide 135 and are each pressed against the packets 110 in the particular stations while the turret is stationary.

Figure 13:
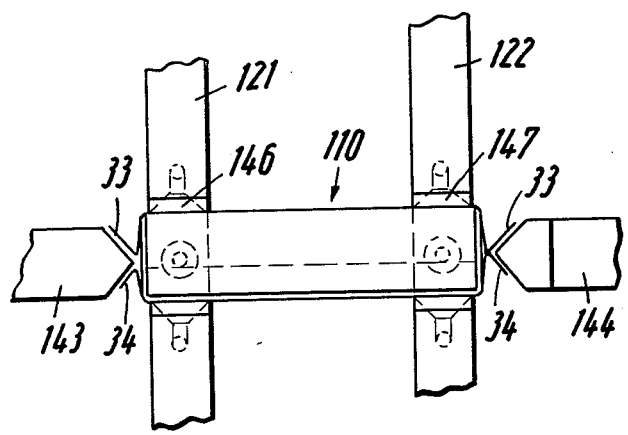
FIG. 13 shows a radially directed view of the detail of the turret in the folding station as shown in FIGS. 11 and 12.
Figure 12:
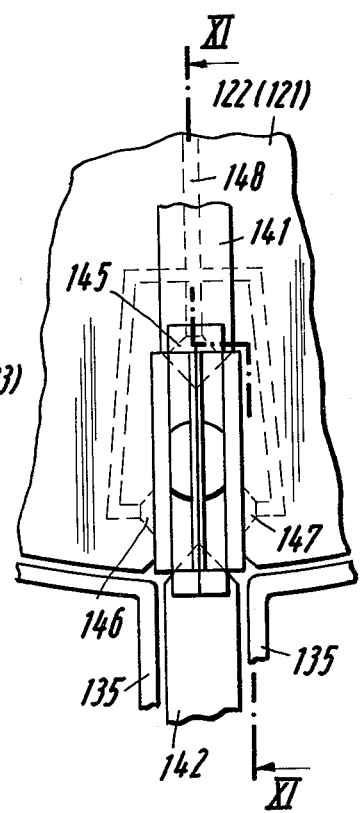
FIG. 12 shows a side view of the turret in the zone of the folding station.
Figure 11:
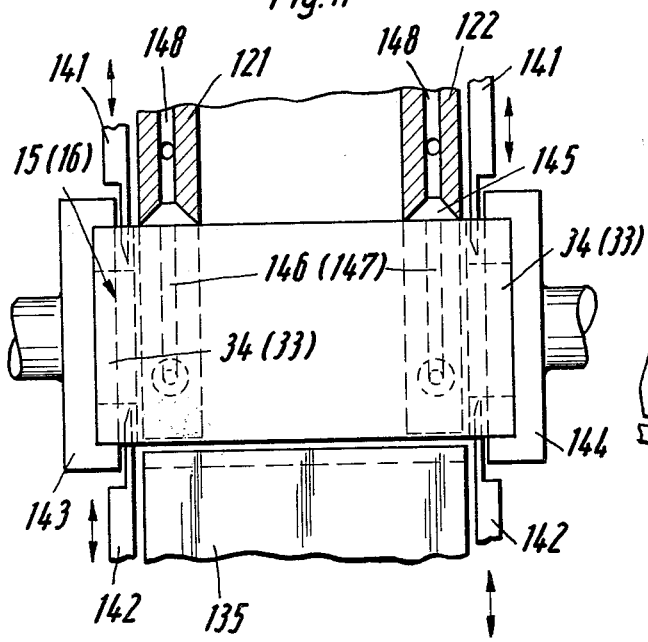
FIG. 11 shows a sectional view of a detail of a turret in the apparatus of FIGS. 9 and 10, taken along the line XI—XI of FIG. 12, in the zone of the folding station, with the outer guide removed.

Following this, a specially constructed end folding station 140 is associated with the turret 119, the details of the station 140 being shown in FIGS. 11 to 13.

Two thin-walled jabbing folders 141 and 142 are provided on the outsides of each of the turret discs 121 and 122 for folding the front of the packet. The folders 141 and 142 act against one another substantially in the radial direction of the turret 119, so that, due to the folding movement, the lateral end flaps 17 and 18 projecting laterally over the contents of the packet are folded, if necessary with parts of the longitudinal end flaps 15 and 16, against the contents of the packet.

Substantially simultaneously, laterally disposed shaping punches 143 and 144 are moved up to the front surfaces of the packet. The folding initiated by the jabbing folders 141 and 142 is completed and secured. At the same time, the closure strips 33 and 34 are moved into the wedge-shaped position (see FIG. 3).

During the various folding and conveying operations, the blank 118 is fixed in the pockets 120. To this end, a suction bore 145, 146 or 147 is apportioned to each surface of the pocket 120. The bores are connected via suction lines 148 to an annular channel 149 formed in a fixed ring 150, and connected to a negative pressure source.

The packet 110, prepared in the front folding station 140 as far as the intermediate folding station (see FIG. 3), is conveyed by the turret 119 to an ejection station 151 at which the packet is ejected from the pocket 120 by a horizontally reciprocating ejecting member 152 mounted between the two turret discs 121 and 122. The packet moves into the zone of a welding unit 153 following the turret (see FIGS. 14 and 15).

The packet is conveyed in operational strokes, with its end surfaces directed laterally, by an entraining belt 154. A fixed upper guide 155 extends above the packets 110. A lower guide 157, which receives the top run of the entraining belt 154 in a recess 156, is U-shaped in cross-section and, therefore, engages around the packets 110 to about half the height of the front surface 111. The continuous lower guide 157 has side walls 158 and 159 which terminate in wedge-shape upwards. As a result, bearing surfaces 215 are produced which descend outwards at an inclination and extend over the while width of a side wall 158 or 159. The lower closure strip 34 of the packet 110 bears against the bearing surfaces 215. The side walls 158 and 159 have suction channels 160 which discharge on the incline bearing surface 215. By means of the suction channels 160, which are connected to a negative pressure source, the closure strip 34 is fixed in the wedge-shaped position.

The packets 110, including the continuous upper guide 155, are enclosed in a first partial zone adjoining the turret 119 by a fixed counter-holder 161, which is adjoined by a welding punch 162 which is of identical cross-section but is vertically adjustable. In cross-section, both the members 161 and 162 are U-shaped and have side walls 163 and 164 terminating in wedge shape. This produces two surfaces directed at an angle to one another, namely an outer inclined bearing surface 216 and an inner pressure surface 217. The bearing surface 216 temporarily fixes the upwardly directed closure strip 33. To this end, the side walls 163 and 164 also have suction bores 165 which discharge in the zone of the bearing surfaces 216.

In this position of the closure strips 33 and 34, laterally disposed activators, in the embodiment illustrated infra-red radiators 166 and 167, can act on the surfaces of the closure strips 33 and 34 to be connected to one another. As soon as the surfaces in question, for instance a plastics material coating or a thermally reacting adhesive, are activated, the closure strips of the packet in the zone of the welding punch 162 are pressed against one another by lowering of the welding punch 162 in relation to the packet 110, the top closure strip 33 being entrained. The pressure surface 217 presses the closure strip 33 against the adjacent surface of the closure strip 34, whose relative position remains unchanged. The two closure strips 33 and 34 are, therefore, pressed together between on the one hand the side walls 158 and 159, acting as pressing jaws in this embodiment, and on the other hand the side walls 163 and 164.

As operations continue, the interconnected closure strips 33 and 34 projecting from the end surfaces are folded over against the end surfaces and fixed thereon.

This final folding operation is performed outside the welding unit 153. The packets are successively moved by the entraining belt 154 out of the welding unit 153 and into a packet conveyor 168. From the latter, the packets are introduced successively by a vertically operating lifter 218 into an upright packet collector 219. In the zone of the end surfaces, the packet collector 219 has walls which terminate above the packet conveyor 168. Due to the lifting movement of the packets 110, performed by the lifter 218, the projecting closure strips 33 and 34 are folded over against the front surface 111 when the packet enters the packet collector 219.

Figure 16:
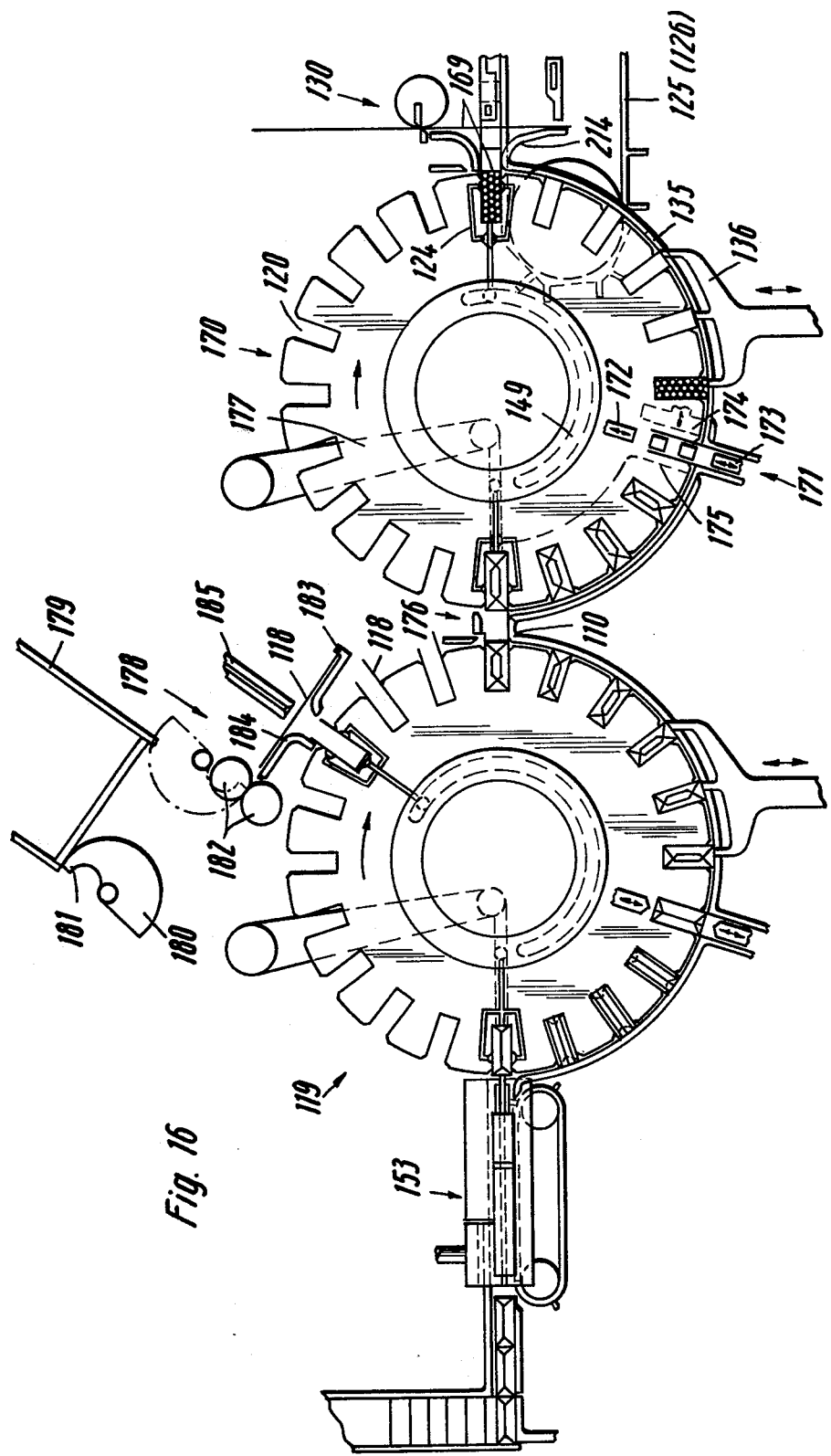
FIG. 16 shows a diagrammatic side view of an alternate embodiment of apparatus for the manufacture and closure of packets, with inside and outside insertion.
Figure 17:
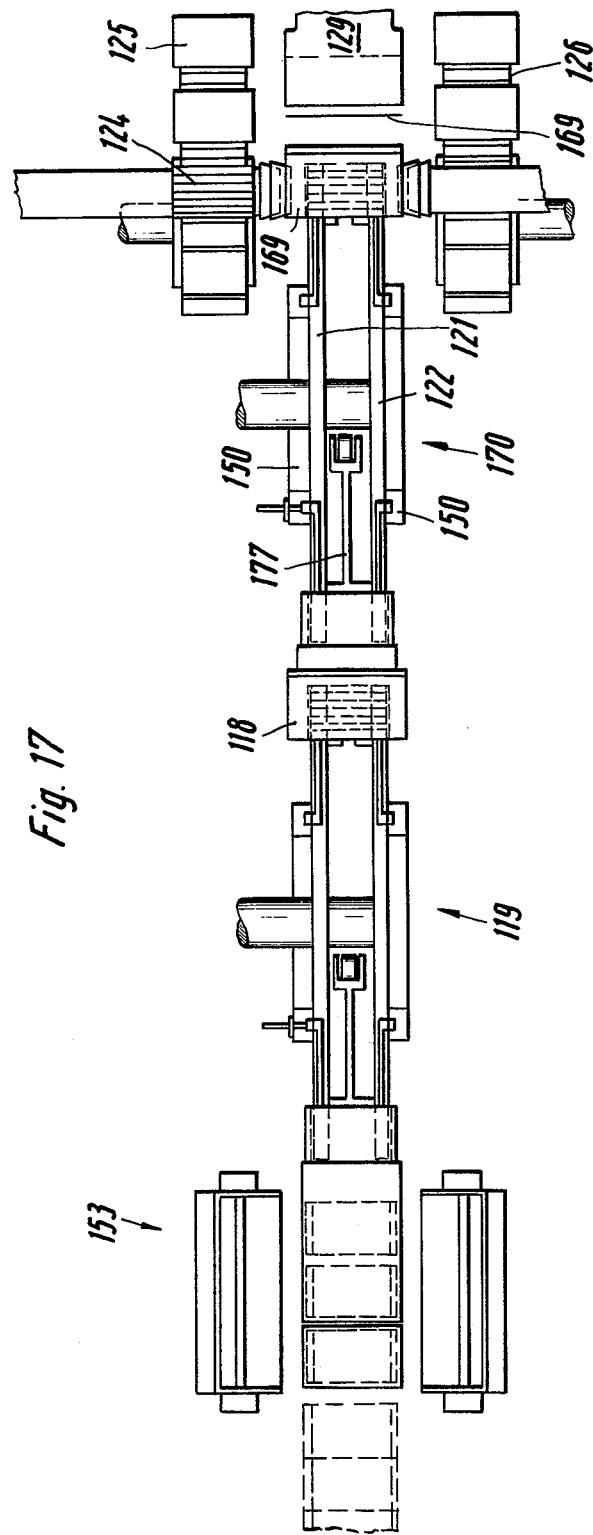
FIG. 17 shows a plan view of the apparatus of FIG. 16.
Figure 18:
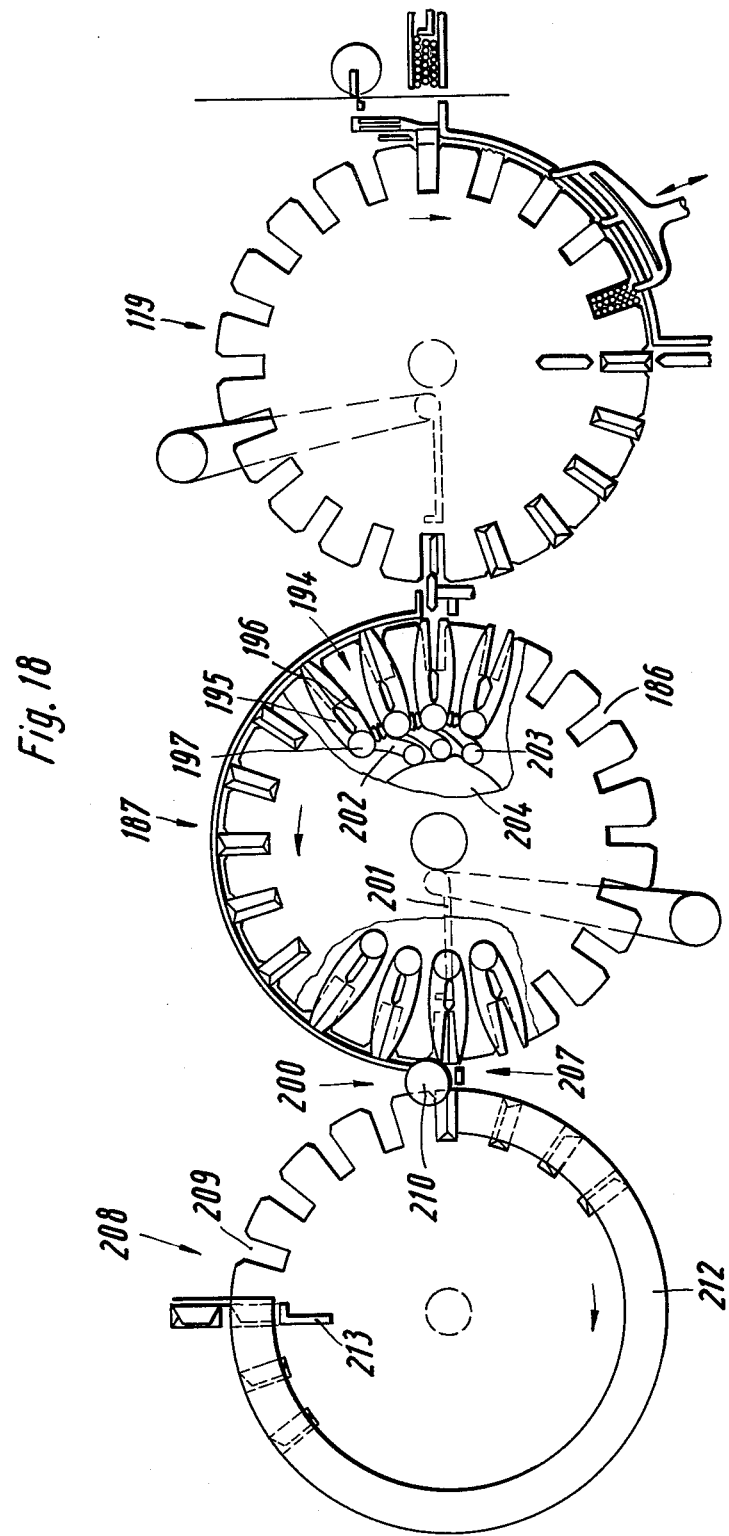
FIG. 18 shows a diagrammatic side view of a further embodiment of apparatus for the manufacture and closure of packets, with a dry turret.

In the apparatus illustrated in FIGS. 16 and 17, the turret 119 is preceded by a second turret 170 which wraps the groups of cigarettes 124 delivered in the manner already described into an inner blank 169, more particularly a tinfoil blank. The blocks of cigarettes thus wrapped are fed to the turret 170 and there wrapped into a further blank 118, acting in this case as the second, outer blank.

The turret 170 corresponds to the turret 119 as regards its basic construction, namely the design of the pockets 120. Other corresponding features are the feed of the blank 169, the feed of the groups of cigarettes 124, the making of the hose-shaped intermediate folding position of the blanks 169, and the multiple punch 136. There is one difference from the turret 119 in the zone of an end folding station 171, at which first the lateral end flaps of the blank 169 are folded against the contents of the packet by radially mobile jabbing folders 172 and 173. The rearward longitudinal end flap, viewed in the direction of movement of the turret 170, is folded over by a folding strip 174 which can reciprocate horizontally over the front surfaces of the packet and is disposed laterally alongside the turret 170. The front longitudinal end flap, viewed in the direction of movement of the turret 170, is folded over by the front edge of a lateral guide 175 whose zone the packets enter.

The partial packets, furnished with the completely folded blank 179, are removed at an ejection station 176 from the turret 170 and pushed into the turret 119 or into one of the pockets thereof. For this purpose, use is made of a horizontally reciprocable ejector 177 disposed between the turret discs of the turret 170.

U-shaped folded blanks 118 have already been fixed in the pockets 120 of the turret 119. The partial packet is then inserted into an open blank 118. As a result, in relation to the blank 118, the partial packet has the starting position as in the filling station 130 of the turret 119 in the embodiment illustrated in FIGS. 9 to 15. The further folding operations in the turret 119 (see FIGS. 16 and 17), therefore, correspond.

One particular feature relates to the feed of the blanks 118. In the zone of the blank station 178, the individual blanks 118 are successively taken from a blank magazine 179 by a rolling-down member 180 which seizes each blank 118 at one edge by means of a suction bore 181 and feeds it by rotation to a pair of rollers 182 which convey the blank 118 on to a platform 183 disposed substantially tangentially in relation to the turret 119.

The platform 183 has a central mouthpiece opening 184 through which the blank 118 lying on the platform 183 can be introduced by an introducing member 185 into a pocket 120 disposed adjacent the mouthpiece opening. The introducing member 185 is constructed in the same manner as the insertion member 129. In both cases, the introducing member 185 and the insertion member 129 have suction bores which discharge at the end surface and by which the blank is fixed when introduced without any change in the relative position.

Another embodiment of a packing apparatus is illustrated in FIGS. 18 to 21, for making packets 110 from a blank 118 using a folding mechanism corresponding to the examples shown in FIGS. 1 to 8.

Accordingly, a first turret 119 corresponds in construction and operation to the turret of the embodiment illustrated in FIGS. 9 to 15. The packets 110 are prepared in the turret 119 as far as the folding position (see FIG. 3). In this intermediate folding position, the packets 110 are removed from the turret 119 and introduced into pockets 186 of an adjoining turret 187 constructed basically (as regards discs and the like) like the turret 119. The closure strips 33 and 34 extend laterally beyond the turret 187 which has on its sides closure tools by which the previously activated surfaces of the closure strips 33 and 34 which turn towards one another are pressed together.

On their way from the turret 119 to the turret 187, the packets pass through a track with an upper guide 188 and lower guide 189. (See FIG. 21.) Both guides are U-shaped in cross-section. Vertical side walls 190 and 191 terminate in wedge-shaped portions, so as to produce outwardly diverging bearing surfaces for the closure strips 33 and 34 directed in wedge-shape in relation to one another.

From outside, rollers 192 and 193 approach the closure strips 33 and 34. The latter are activated, for instance, by the application of glue, by wedge-shaped outer surfaces of the rollers 192 and 193.

Figure 19:
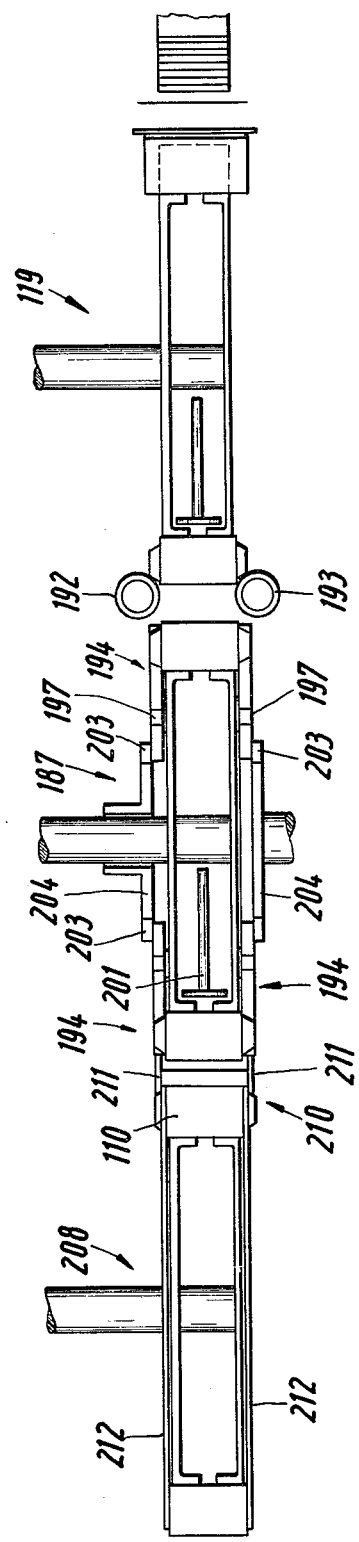
FIG. 19 shows a plan view of the apparatus of FIG. 18.
Figure 20:
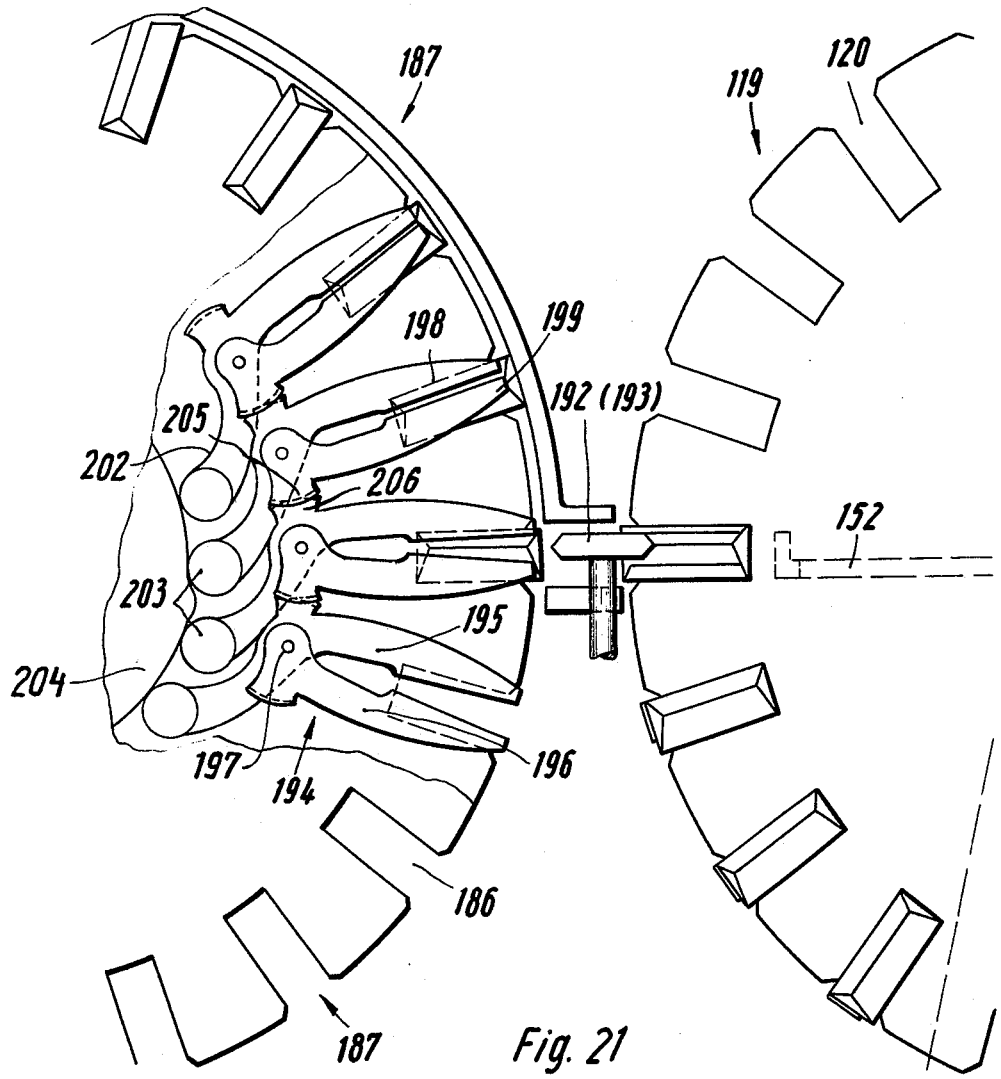
FIG. 20 shows a side view, to an enlarged scale, of a detail, namely the facing zones of adjacent turrets, of the apparatus of FIG. 18.
Figure 21:
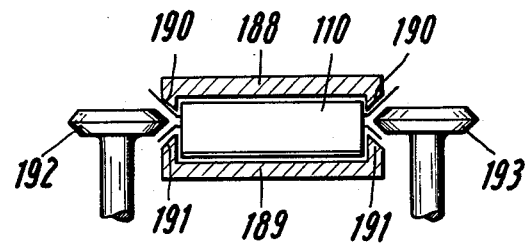
FIG. 21 shows a cross-sectional view, also to an increased scale, of the apparatus of FIG. 18, in the zone of transfer of a packet between adjacent turrets.

In the turret 187, the activated closure strips 33 and 34 are pressed together. To this end, the turret 187 has closure tongs 194 on both sides. As can also be seen from FIG. 20, the closure tongs 194 consist of two tongs arms 195 and 196 which can be pivoted in relation to one another around a pivot pin 197 which, as shown in FIG. 19, is mounted on the outside of the turret discs.

The ends of the tongs arms 195 and 196 remote from the pivot pin 197 take the form of pressing jaws 198 and 199. The closure strips 33 and 34 are introduced between the pressing jaws 198 and 199 with the tongs arms 195 and 196 moved apart, whereafter the closure strips 33 and 34 are pressed together. In this pressing position, the closure tongs 194 are moved, together with the packets 110, along a path of the turret 187. The tongs arms 195 and 196 are opened in the zone of an ejection station 200. The closed packets 110 can then be ejected from the pockets 186 of the turret 187 by an ejector 201.

One of the tong arms 195 or 196 is extended beyond the pivot pin 197 by a pivoting arm 202, running down by an actuating roller 203 over the periphery of a cam disc 204. The cam disc 204 is so constructed that the aforedescribed opening and closing movements of the tongs arms 195 and 196 are performed. A movement is transmitted to one of the tongs arms 195 and 196 by the cam disc 204 via the actuating roller 203 and the pivoting arm 202. The movement is transmitted accordingly by tooth segments 205 and 206 on the adjacent tongs arm of the following closure tongs 194, so that both arms 195 and 196 are moved jointly and pressed together with adequate pressure.

The closed packets 110 emerging from the turret 187 run over an intermediate guide 207 to a further, third turret 208. The third turret 208 is also basically constructed like the preceding turrets 119 and 187, that is to say consists of two turret discs with pockets 209 formed by radial recesses.

Before the packets 110 enter the pockets 209 of the turret 208, that side of the interconnected closure strips 33 and 34 to be pressed against the front surfaces of the packet (see FIG. 4) is activated or furnished with an adhesive in the zone of the intermediate guide 207. To this end, the intermediate guide 207 has a glue-applying roller 210. The roller 210 has two lateral flanges 211 which run down with the outer surfaces over the top side of the closure strips 33 and 34, during which either glue is applied or the surface areas concerned are activated.

The rotation of the turret 208 makes the packets 110 with the activated closure strips 33 and 34 run into the zone of lateral guides 212 disposed on both sides of the turret 208. The inlet edge of the lateral guides 212 folds the closure strips 33 and 34 over against the end surfaces of the packets. In this position, the packets 110 are conveyed along an adequate path of the turret 208 and then ejected by a tappet 213 from the pockets 209.

FIG. 22 shows a variant of the apparatus illustrated in FIGS. 18 to 21, in which the turret 187 is differently constructed. The turret 187 again has closure tongs 194 whose arms 195 and 196 are jointly actuated mechanically, for instance, as in the embodiment illustrated in FIGS. 18 to 21. For reasons of simplicity, FIG. 22 does not show the pivoting arm, actuating roller, cam disc or tooth segments.

However, as shown in FIG. 22, the movements of the tongs arms 195 and 196 are such that the tongs arms 195 and 196 are opened before the ejection station 200 is reached. The whole open closure tongs 194 perform a pivoting movement in relation to the packets 110, so that, for instance, the front pressing jaw 198, viewed in the direction of rotation of the turret 187, is moved away over the end surfaces of the packet contrary to the direction of rotation of the turret 187. As a result, the interconnected closure strips 33 and 34 are constrainedly folded over and pressed against the end surfaces of the packets. The closure strips 33 and 34 have previously been activated or furnished with glue. However, the pressing jaw 199 can also be heated, so that when the closure tongs 194 make the pivoting movement contrary to the direction of rotation of the turret 187, thermally reactive coatings of the closure flaps are activated by the pressing jaws 198.

We claim:

1. In an apparatus for the manufacture and closure of packets from a blank which
   (a) encloses the contents of the packet in the manner of a hose and
   (b) has end flaps which
       (i) project from two opposite faces and
       (ii) can be connected together by pressing them together, said apparatus comprising a first turret having pockets for receiving the packets, the improvement comprising a plurality of pairs of closing tongs individually mounted on said first turret adjacent to each of said pockets, each of said closing tong pairs comprising two tong arms relatively pivotable with respect to each other about a common axis, said tong arms being shaped and positioned to press together the end flaps on a packet positioned in the associated pocket with its end flaps projecting from the pocket, one tong arm of each pair including a pivot arm extending beyond said axis and terminating in cam follower means, and a first toothed segment, the other tong arm of each pair including a second toothed segment in engagement with an adjacent first toothed segment, and a cam dis mounted proximate said first turret, in engagement with said cam follower means, and shaped to control said closing tongs, whereby the successive pivoting movement of each of said one tong arms is transmitted to an adjacent one of said other tong arms via said first and second toothed segments.

2. Apparatus as recited in claim 1 wherein each of said tong arms comprises a clamping jaw sized and positioned to engage one end of a packet.

3. Apparatus as recited in claim 1 wherein each pair of tong arms is pivotable about a common pivot pin mounted on said first turret.

4. Apparatus as recited in claim 3 wherein
   (a) said first turret comprises two spaced apart turret disks mounted on a common shaft;
   (b) said pockets comprise corresponding, substantially rectangular, radially directed recesses open to the outside in each of said tureet disks; and
   (c) said pivot pins are mounted in said turret disks.

5. Apparatus as recited in claim 1
   (a) and further comprising
       (i) means for inserting open pockets into the pockets of said first turret at a first point on its perimeter and
       (ii) means for ejecting closed packets from the pockets of said first turret at a second point on its perimeter,
   (b) wherein said closing tongs are maintained in their closed position from the time they are initially actuated until the packets reach the second point on the perimeter of said first turret.

6. Apparatus as recited in claim 1 and further comprising:
   (a) a second turret located adjacent to said first turret and
   (b) means mounted on said second turret for pressing the end flaps on each packet against a face of the packet.

7. Apparatus as recited in claim 6 wherein (a) said second turret has pockets for receiving the packets and
(b) said means comprise a lateral guide disposed laterally in the region of the pockets of said second turret.

8. Apparatus as recited in claim 6 and further comprising a gluing roller mounted on a horizontal axis between said first and second turrets, said gluing roller having two flanges sized and positioned to apply glue to the side of each end flap which is to be pressed against a face of the packet.

9. Apparatus as recited in claim 1 and further comprising a gluing roller mounted adjacent to the outer perimeter of said first turret in position to apply glue to the surfaces of the end flaps which are to be pressed together.

10. Apparatus as recited in claim 9 wherein said gluing roller has a V-shaped bearing surface which is positioned so as to pass between the surfaces of the end flaps which are to be pressed together.

11. In an apparatus for the manufacture and closure of packets from a blank which
(a) encloses the contents of the packet in the manner of a hose and
(b) has end flaps which
  (i) project from two opposite faces and
  (ii) can be connected together by pressing them together, said apparatus comprising a first turret having pockets for receiving the packets, the improvement comprising a plurality of pairs of closing tongs individually mounted on said first turret adjacent to each of said pockets, each of said closing tong pairs comprising two tong arms relatively pivotable with respect to each other about a common axis, said tong arms being shaped and positioned to press together the end flaps on a packet positioned in the associated pocket with its end flaps projecting from the pocket, a gluing roller mounted adjacent to the outer perimeter of said first turret in position to apply glue to the surfaces of the end flaps which are to be pressed together, an upper guide for the packets which has wedge-shaped side walls shaped and positioned to contact one of the end flaps on each packet, a lower guide for the packets which has wedge-shaped side walls shaped and positioned to contact the cooperating end flap on each packet, said upper and lower guides being mounted adjacent to said gluing roller in position so that said gluing roller pressed the end flaps against the wedge-shaped side walls on said guides while applying glue to the end flaps.

12. Apparatus as recited in claim 11 wherein said gluing roller has a V-shaped bearing surface which is positioned to cooperate with adjoining wedge-shaped sidewalls of said upper and lower guides such that the surfaces of the end flaps of each packet pass therebetween.

* * * * *